United States Patent
Sumiyoshi et al.

(10) Patent No.: US 9,989,626 B2
(45) Date of Patent: Jun. 5, 2018

(54) MOBILE ROBOT AND SOUND SOURCE POSITION ESTIMATION SYSTEM

(71) Applicant: Hitachi, Ltd., Chiyoda-ku, Tokyo (JP)

(72) Inventors: Takashi Sumiyoshi, Tokyo (JP); Yasunari Obuchi, Tokyo (JP); Naoyuki Kanda, Tokyo (JP); Ryu Takeda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 227 days.

(21) Appl. No.: 14/783,008

(22) PCT Filed: Apr. 12, 2013

(86) PCT No.: PCT/JP2013/061008
§ 371 (c)(1),
(2) Date: Dec. 17, 2015

(87) PCT Pub. No.: WO2014/167700
PCT Pub. Date: Oct. 16, 2014

(65) Prior Publication Data
US 2016/0103202 A1     Apr. 14, 2016

(51) Int. Cl.
*G01S 5/18* (2006.01)
*G01S 3/808* (2006.01)

(52) U.S. Cl.
CPC .............. *G01S 5/18* (2013.01); *G01S 3/8083* (2013.01)

(58) Field of Classification Search
CPC ................................ G01S 5/18; G01S 3/8083
USPC ........................................................ 367/118
See application file for complete search history.

(56) References Cited

U.S. PATENT DOCUMENTS

| | | | |
|---|---|---|---|
| 2006/0167588 A1* | 7/2006 | Kong | G05D 1/0255 700/245 |
| 2007/0233321 A1* | 10/2007 | Suzuki | G05D 1/0251 700/245 |
| 2009/0226041 A1* | 9/2009 | Szajnowski | G01S 5/04 382/106 |

(Continued)

FOREIGN PATENT DOCUMENTS

| | | |
|---|---|---|
| CN | 102084408 A | 6/2011 |
| JP | 2007-152470 A | 6/2007 |

(Continued)

OTHER PUBLICATIONS

Chinese-language Office Action issued in counterpart Chinese Application No. 201380077331.9 dated Dec. 2, 2016 (Nine (9) pages).

(Continued)

*Primary Examiner* — Isam A Alsomiri
*Assistant Examiner* — Amie M Ndure
(74) *Attorney, Agent, or Firm* — Crowell & Moring LLP

(57) ABSTRACT

The present invention pertains to a method for estimating a sound source position in a space with high accuracy using a microphone installed on a robot moving in the space. A mobile robot includes a self-position estimation unit configure to estimate the self-position of the mobile robot, a sound source information obtaining unit configured to obtain direction information of an observed sound source, and a sound source position estimation unit configured to estimate the position of the sound source based on the estimated self-position and the direction information of the sound source.

14 Claims, 10 Drawing Sheets

(56) References Cited

U.S. PATENT DOCUMENTS

2010/0034397 A1* 2/2010 Nakadai .................... B25J 5/00
381/58
2011/0050482 A1 3/2011 Nanami

FOREIGN PATENT DOCUMENTS

| JP | 2007-264472 A | 10/2007 |
|---|---|---|
| JP | 2009-162413 A | 7/2009 |
| JP | 2009-531697 A | 9/2009 |
| JP | 2011-149782 A | 8/2011 |

OTHER PUBLICATIONS

Tong, W., et al., "Multisensor Target Tracking and Fusion Approach", Acta Acustica vol. 28, No. 5, Sep. 30, 2003 including English abstract (Five (5) pages).

Xiang, Z., et al., "Feature-Tracking Based Mobile Robot Positioning", China Journal of Scientific Instrument, Aug. 31, 2003, vol. 24, No. 4, pp. 391-394, with English abstract (Four (4) pages).

International Search Report issued in PCT Application No. PCT/JP2013/061008 dated Jul. 16, 2013 with English translation (Four (4) pages).

* cited by examiner

MOBILE ROBOT AND SOUND SOURCE POSITION ESTIMATION SYSTEM

BACKGROUND

The present invention pertains to a method for estimating a sound source position in a space with high accuracy using a microphone installed on a robot moving in the space.

In recent years, service robots existing with people in a space and moving for providing various kinds of services have been developed. A microphone is installed in such a robot as communication means with people and some robots have a function to have conversations with people using the voice recognition technology. Also developed is a security robot which patrols a building, detects abnormality by a camera or microphone installed thereon and reports it immediately. Further, proposed is a multipurpose and efficiently utilized robot equipped with both of a service function and a security function for providing services in the day time and security at night.

A robot with a security function is required to detect types of abnormality the same as or more than a security guard of person. As a corollary to it, the robot is expected to detect unusual sounds while guarding. Two types of function are required for detecting sound abnormalities, one is a function to determine whether an observed sound is abnormal, and the other is a function to send the type of the sound, the occurrence time of the sound and the position of the sound.

As a technique to send the position of sound, a technique is developed to locate the position of a sound source from a sound waveform observed by a mobile robot equipped with a microphone.

Patent Literature 1 discloses a method for measuring a sound source position accurately by the principal of triangulation.

Patent Literature 1: JP2011-149782A

SUMMARY

However, for measuring the position of a sound source accurately using the principal of triangulation, it is necessary to measure the position of the robot and the arrival direction of sound from the sound source viewed from the robot. For example, a method incorporating odometry and scan matching is proposed as a method for estimating the position of a robot. However, there are cases where the method cannot estimate the position of the robot accurately, for example, accurate odometry information may not be obtained because of the influence of disturbance such as errors of wheel slip due to moving fast, or the matching with a map may not succeed because of lack of the information regarding the surrounding environment.

As described above, an attempt to measure the position of a sound source accurately by a mobile robot results in an inaccurate estimated sound source position if the position of the robot is not estimated accurately, even if the arrival direction of sound from the sound source is accurate.

Further, it is impossible to estimate the sound source position accurately when the observation of the self-position of the robot and the observation of the arrival direction of sound from the sound source are not synchronized sufficiently.

For solving the above problem, a mobile robot includes a self-position estimation unit configure to estimate the self-position of the robot, a sound source information obtaining unit configured to obtain direction information of an observed sound source, and a sound source position estimation unit configured to estimate the position of the sound source based on the estimated self-position and the direction information of the sound source.

The present invention allows a mobile robot to measure the position of a sound source accurately. Furthermore, the present invention improves the estimation accuracy of the self-position of the robot.

DETAILED DESCRIPTION OF EMBODIMENTS

Hereinafter, embodiments are described with reference to drawings.

Embodiment 1

In the present embodiment, an example of a sound source position estimation robot 11 is explained.

Figure 1:
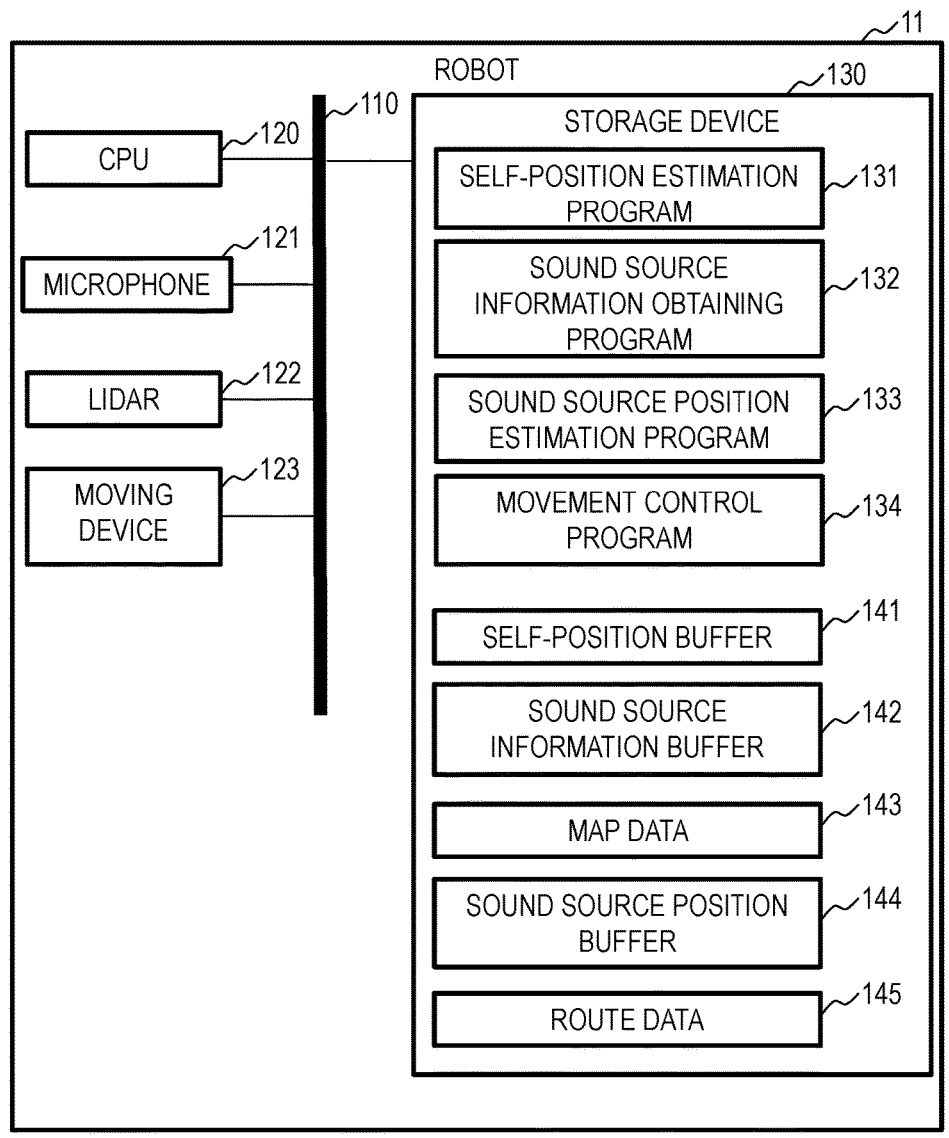
FIG. 1 an example of configuration diagram of a sound source position estimation robot according to Embodiment 1.

FIG. 1 is an example of configuration diagram of the sound source position estimation robot according to the present embodiment.

The sound source position estimation robot 11 is configured to include a bus 110, a CPU 120, a microphone 121, a LIDAR 122, a moving device 123, and a storage device 130.

The bus 110 interconnects the CPU 120, the microphone 121, the LIDAR 122, the moving device 123 and the storage device 130 to relay data signals among them, and the standards (PCI, for example) used in general purpose computers may be used for bus 110.

The CPU 120 operates in accordance with programs and sends control commands to the microphone 121, the LIDAR 122, the moving device 123 and the storage device 130 to control them. A general purpose CPU (SH-4 processor, for example) or a general purpose chip controller may be used for the CPU 120.

The microphone 121 collects sounds around the robot. A commercial capacitor microphone and an A/D converter may be used for the microphone 121.

The LIDAR 122 is a device which measures distance to an obstacle in each direction on an observation plane by illuminating the obstacle with electromagnetic waves such as visible rays and analyzes the reflected waves. In the present embodiment, the observation plane is parallel to the ground and the direction resolution 1; however, the present invention is not restricted to the specifications.

The storage device 130 stores programs and data. For example, a commercial DRAM or HDD may be used for the storage device 130. The storage device 130 stores a self-position estimation program 131, a sound source information obtaining program 132, a sound source position estimation program 133, a movement control program 134, a self-position buffer 141, a sound source information buffer 142, map data 143, a sound source position buffer 144, and route data 146.

Figure 2:
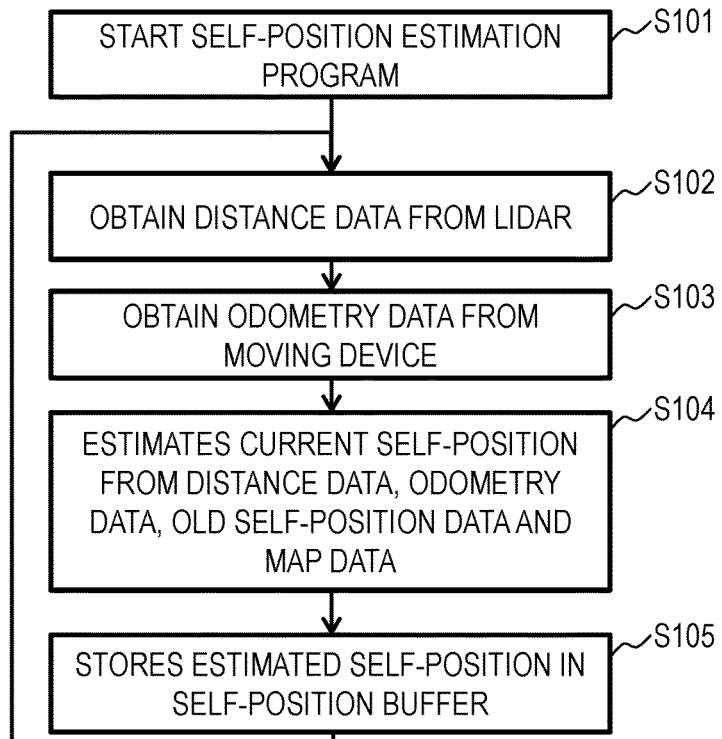
FIG. 2 is a flowchart showing an operation of a self-position estimation program 131 stored in a storage device 130 according to Embodiment 1.

FIG. 2 is a flowchart showing an operation of the self-position estimation program 131 stored in the storage device 130.

The self-position estimation program 131 is operational all the time while the present system is used (S101).

First, the self-position estimation program 131 obtains distance data $L_t(\theta)$ indicating the distance to an obstacle in each direction on the observation plane from the LIDAR 122 (S102). Next, the self-position estimation program 131 obtains odometry data $O_t=\{O_{xt}, O_{yt}, O_{\theta t}\}$ from the moving device 123 (S103). Next, the self-position estimation program 131 estimates the current self-position using the obtained distance data, the odometry data, the old self-position data $P_{t-1}$ stored in the self-position buffer 141 and the map data 143 M(x, y) (S104).

The estimation method may employ a known self-position estimation scheme by scam matching using odometry information. Using a function F(P|M, L) which, when the self-position P is assumed, represents the matching degree between the observed landform indicated by the distance data L and the landform at the self-position P in the map data M, the self-position estimation program 131 searches for the estimated self-position $P_t=\text{argmax}_p F(P|M, L_t(\theta))$ in the range of P centered around $P_{t-1}+O_t$ with the constant width of x, y, θ, and determines the estimated self-position $P_t$.

The self-position estimation program 131 stores the above estimated self-position $P_t$ in the self-position buffer 141 (S105).

Figure 3:
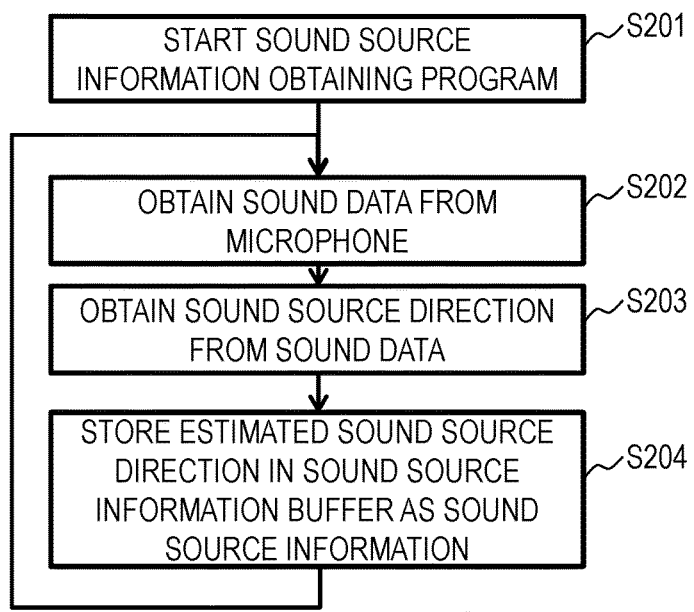
FIG. 3 is a flowchart showing an operation of a sound source information obtaining program 132 stored in the storage device 130 according to Embodiment 1.

FIG. 3 is a flowchart showing an operation of the sound source information obtaining program 132 stored in the storage device 130.

The sound source information obtaining program 132 is operational all the time while the present system is used (S201). First, the sound source information obtaining program 132 obtains sound data $w_t(c)$ from the microphone 121 (S202). Next, the sound source information obtaining program 132 analyzes the obtained sound data $w_t(c)$ and obtains the sound source direction $A_t$ (S203). The sound data $w_t(c)$ is a sample set of waveforms received from the microphone channel c at the time t. $A_t$ is a set of directions in which sound sources are expected to exist. For obtaining the set of directions in which sound sources are expected to exist $A_t$ from the sound data $w_t(c)$, a known method to estimate sound source directions using a microphone array may be used. For example, the sound source direction $A_t$ is calculated from the formula 1 using beamforming.

$$A_t = \{\theta | \Sigma w_t(c) * a(\theta)|^2 > T\} \quad \text{[Formula 1]}$$

$a(\theta)$ is a vector representing a premeasured transfer function of sound from a direction θ, * is a sign of convolution, and T is a power threshold value for determining that a sound source exists. The sound source information obtaining program 132 stores the sound source direction $A_t$ estimated as described above in the sound source information buffer 142 (S204).

Figure 4:
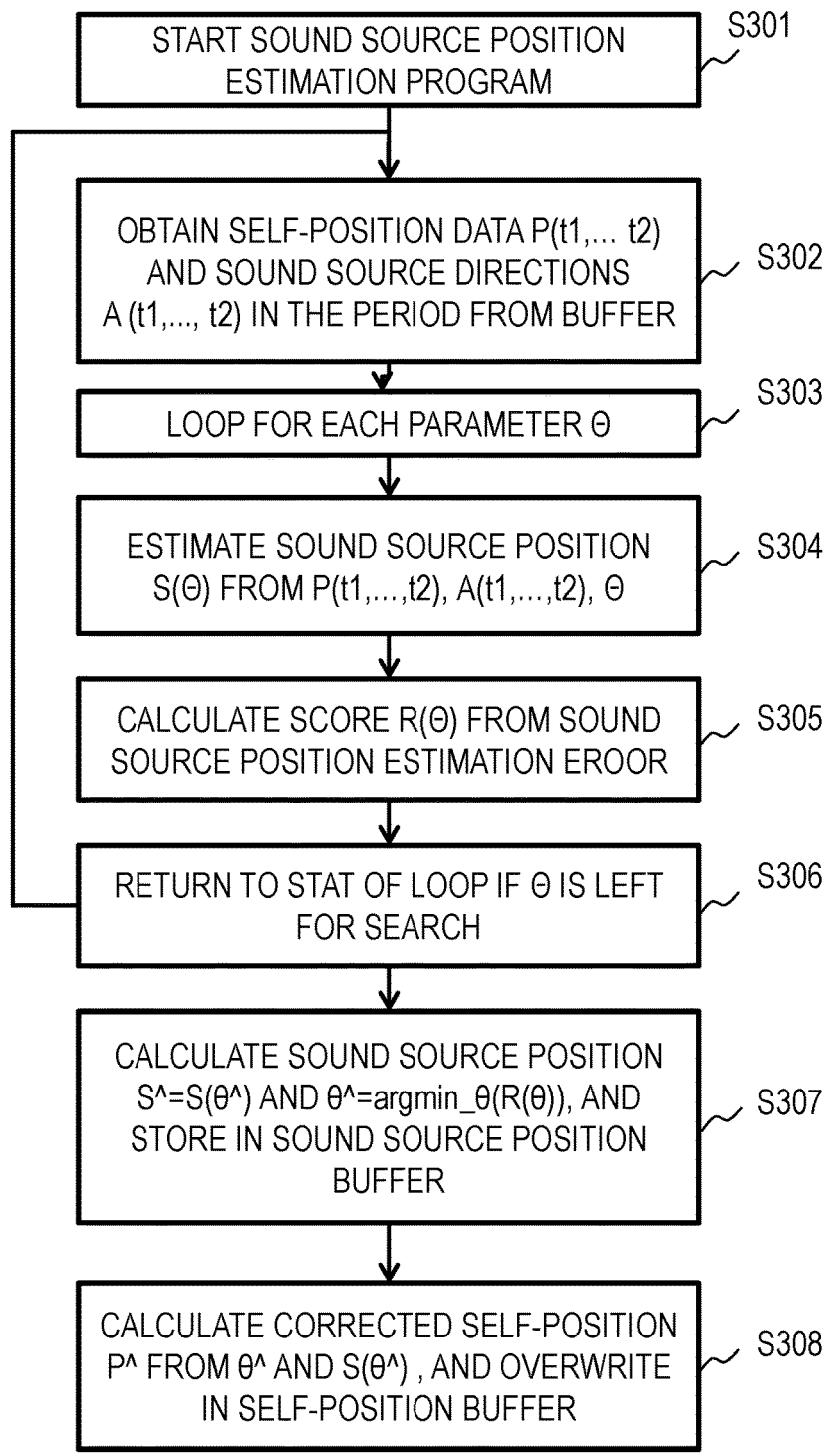
FIG. 4 is a flowchart showing an operation of a sound source position estimation program 133 stored in the storage device 130 according to Embodiment 1.

FIG. 4 is a flowchart showing an operation of the sound source position estimation program 133 stored in the storage device 130.

The sound source position estimation program 133 is operational all the time while the present system is used (S301). First, the sound source position estimation program 133 determines an period $[t_1, t_2]$ for estimating sound source positions and obtains self-position data $P_{t_1}, \ldots, P_{t_2}$ and sound source directions $A_{t_1}, \ldots, A_{t_2}$ in the period $[t_1, t_2]$ from the self-position buffer and the sound source information buffer, respectively (S302). For example, if the information from the current time to the tenth previous frame is used, $[t_1, t_2]=[t-10, t]$.

Next, the sound source position estimation program 133 determines appropriately a parameter Θ of a predetermined moving model of the robot and performs the following process (S303). First, the sound source position estimation program 133 determines a sound source position S(Θ) at the parameter Θ from the self-position data $P_{t_1}, \ldots, P_{t_2}$ and the sound source directions $A_{t_1}, A_{t_2}$ (S304). Below, a specific example to calculate a sound source position is described. It is assumed that the parameter Θ is a parameter set consisting of parameters α and β for correcting the difference between the observation times of the self-position data $P_{t_1}, \ldots, P_{t_2}$ and the sound source directions $A_{t_1}, \ldots, A_{t_2}$ as $t^P = \alpha t^A + \beta$. The sound source position estimation program 133 creates an observed data sequence Di=(Qi, Bi) (i=1, . . . , N) using a predetermined interval δ. Here, $Q_i = P_{\alpha i \delta + \beta}$ and $B_i = A_{i\delta}$. If the data of P or A with a specific numerical subscript does not exist, the sound source position estimation program 133 uses a value obtained by linear interpolation from neighboring data. For each element $b_{i,m}$ of the set $B_i$, a half-line extending in the direction $Q_i^{\theta} + b_{i,m}$ from the start point of the coordinates $(Q_i^x, Q_i^y)$ is defined. The observed data Di represents a set of half-lines as defined above. Next, the sound source position estimation program 133 calculates a set of intersection points of any combinations Di, Dj of calculated observed data sequences and creates an intersection point set $T=\{T_1, \ldots, T_N\}$ by collecting all of the intersection points. The sound source position estimation program 133 estimates the sound source position S(Θ) from an average value of the intersection point set T using the following formula 2.

$$S(\Theta) = \Sigma T_i / N \quad \text{[Formula 2]}$$

For example, the estimation method may estimate sound source positions assuming a Gaussian mixture distribution and determine average values of respective Gaussian distributions to be the sound source positions.

Next, the sound source position estimation program 133 calculates a score R(Θ) obtained from the estimated error of sound source position (S305). Specifically, The score R(Θ)

obtained from the estimated error of sound source position is calculated by the following formula 3 using the dispersion of all the intersections Tx−1.

$$R(\Theta) = -\Sigma |T_n - S(\Theta)|^2 \quad \text{[Formula 3]}$$

The present invention is not restricted to the score calculation method defined above and any score obtained from the estimated error of sound source position may be used. For example, when there are a plurality of sound source positions, it is conceivable that the score is the sum of dispersions from the sound source positions to which intersection points belong. Finally, if a parameter Θ for search is left, the sound source position estimation program 133 returns to S303 (S306). After calculating the sound source position S(Θ) and the score R(Θ) obtained from the estimated error of sound source position for each of all the parameters Θ, the sound source position estimation program 133 estimates the sound source position S(Θˆ) provided by the parameter Θˆ maximizing the score R(Θ) to be the most probable sound source position and stores the estimated sound source position S(Θˆ) in the sound source position buffer 144 (S307). The sound source position S(Θˆ) is obtained by changing the parameter Θ (specifically α and β) to the parameter Θ A for the sound source position S(Θ) at the parameter Θ.

Figure 12:
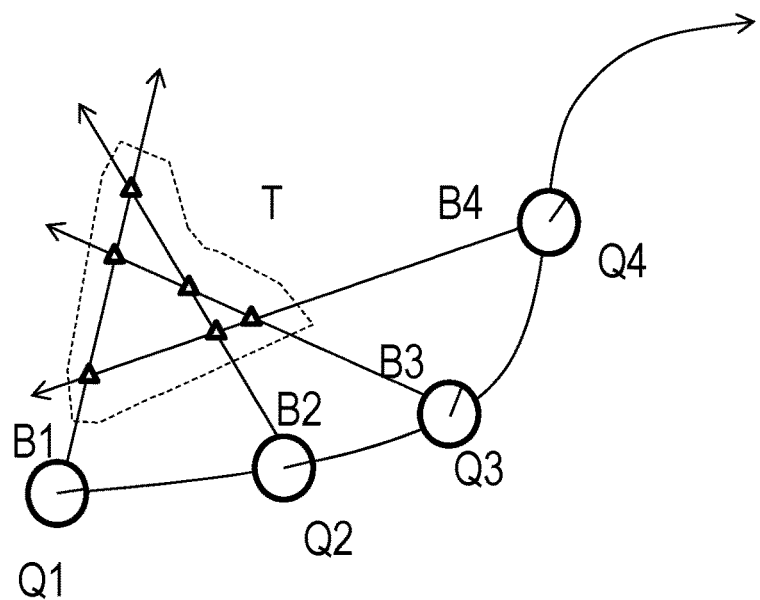
FIG. 12 is a diagram explaining the algorithm of the sound source position estimation program according to Embodiment 1.
Figure 13:
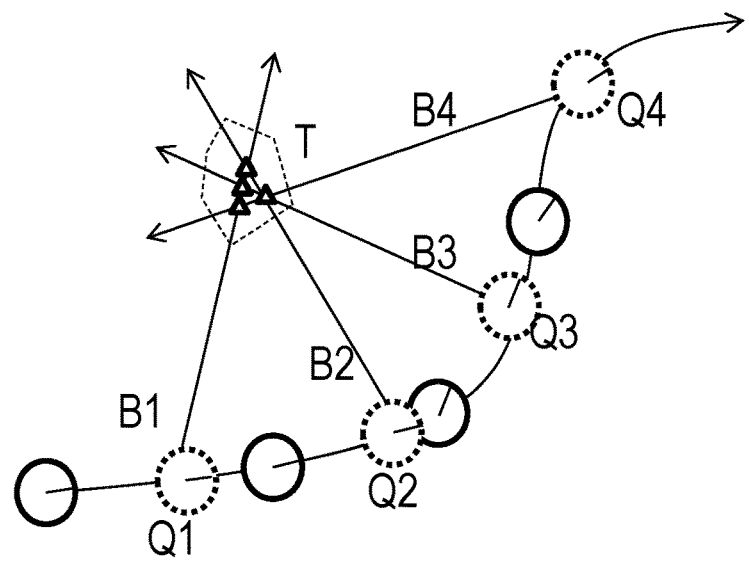
FIG. 13 is a diagram explaining the algorithm of the sound source position estimation program according to Embodiment 1.

As an example, FIG. 12 shows an observed data sequence $D_i=(Q_i, B_i)$ and an intersection point set T={$T_1, \ldots, T_N$} when the parameter Θ=(α=1,β=0) and FIG. 13 shows an observed data sequence $D_i=(Q_i, B_i)$ and an intersection point set T={$T_1, \ldots, T_N$} when the parameter Θ=(α=1, β=1). Comparison of the scores R(Θ) obtained from the dispersions of T results in R(α=1, β=1)>R(α=1, β=0).

Finally, the sound source position estimation program 133 calculates the corrected self-position Pˆ from the parameter Θ A maximizing the score obtained from the estimated error of sound source position and the sound source position S(Θˆ) provided by the parameter Θ A maximizing the score, and overwrite the self-position P in the period [$t_1$, $t_2$] stored at S105 in the self-position buffer 141 with the corrected self-position Pˆ (S308). This corresponds to correction of the current position assuming that the sound source positions are invariable in the space.

An operation of the movement control program 134 stored in the storage device 130 is described here. The movement control program 134 is operational all the time while the present system is used, and moves the whole robot 11 by sending moving commands to the moving device 123 with reference to the route data 145. The present invention is not restricted to the method to use the route data 145 defined in the present embodiment. For example, a method may be employed to install another communication device in the robot 11 and send moving commands to the moving device 123 in accordance with instructions from outside.

The process from S301 may be repeated until the correction amount of the self-position falls in a predetermined range, using the corrected self-position Pˆ estimated at S308. It increases the calculation amount; however, the accuracy of the sound source position and the self-position may be improved because of the repeated estimation of the sound source position and the self-position.

The configuration of the sound source estimation robot 11 in accordance with the specifications described above allows the mobile robot to measure the position of a sound source accurately and improves the estimation accuracy of the self-position.

Embodiment 2

In the present embodiment, an example of sound source position estimation system 1 is described.

Figure 5:
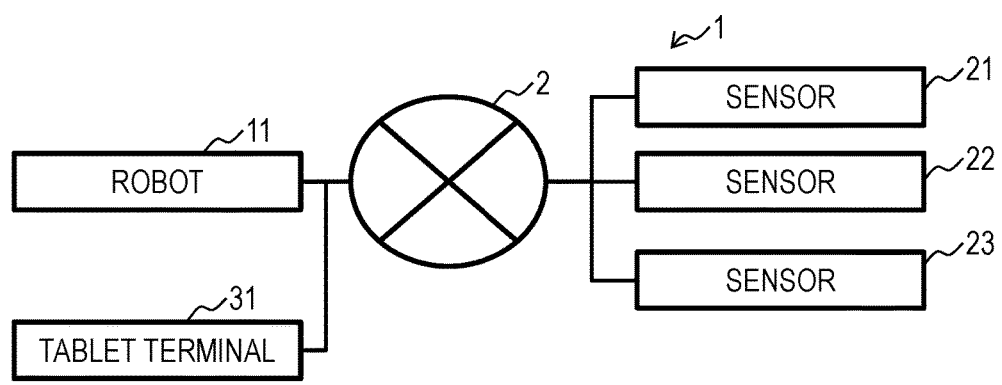
FIG. 5 is an example of configuration diagram of a sound source position estimation system according to Embodiment 2.

FIG. 5 is an example of configuration diagram of a sound source position estimation system according to the present embodiment.

The sound source position estimation system 1 is configured to include a network 2, a robot 11, sensors 21, 22 and 23, and a tablet terminal 31. The robot 11, the sensors 21, 22 and 23, and the tablet terminal 31 are connected with the network 2, which is a TCP/IP network, allocated IP addresses, and capable of communicating with one another. The present invention is not restricted to the network configuration or the number of sensors defined here, and may incorporate any type of network and any number of sensors.

Figure 6:
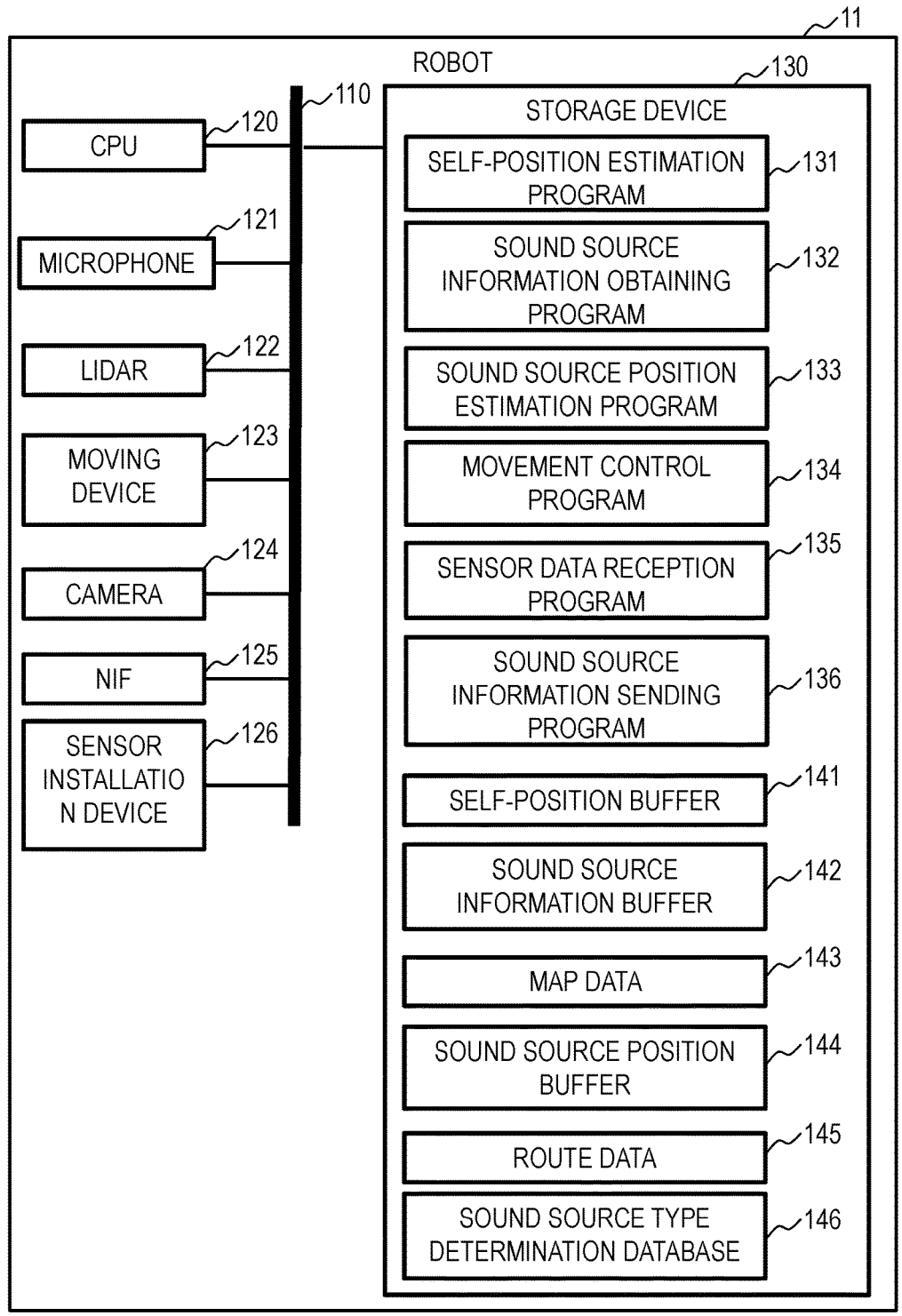
FIG. 6 is an example of configuration diagram of a source position estimation robot 11 according to Embodiment 2.

FIG. 6 is an example of configuration diagram of the sound source position estimation robot 11 according to the present embodiment.

The sound source position estimation robot 11 includes a camera 124, a NIF 125 and a sensor installation device 126 in addition to the configuration described in Embodiment 1, and they are connected with the bus 110. The camera 124 is mounted so as to photograph ahead of the robot 11 and sends taken image data to the CPU 120 in response to a photographing command. The NIF 125 is connected directly with the network 2 and handles communication with other devices. The sensor installation device 126 includes the sensors 21, 22 and 23, and installs them in the environment. The operations of the self-position estimation program 131 and the movement control program 134 are the same as Embodiment 1, and the explanation of their details is omitted.

Figure 7:
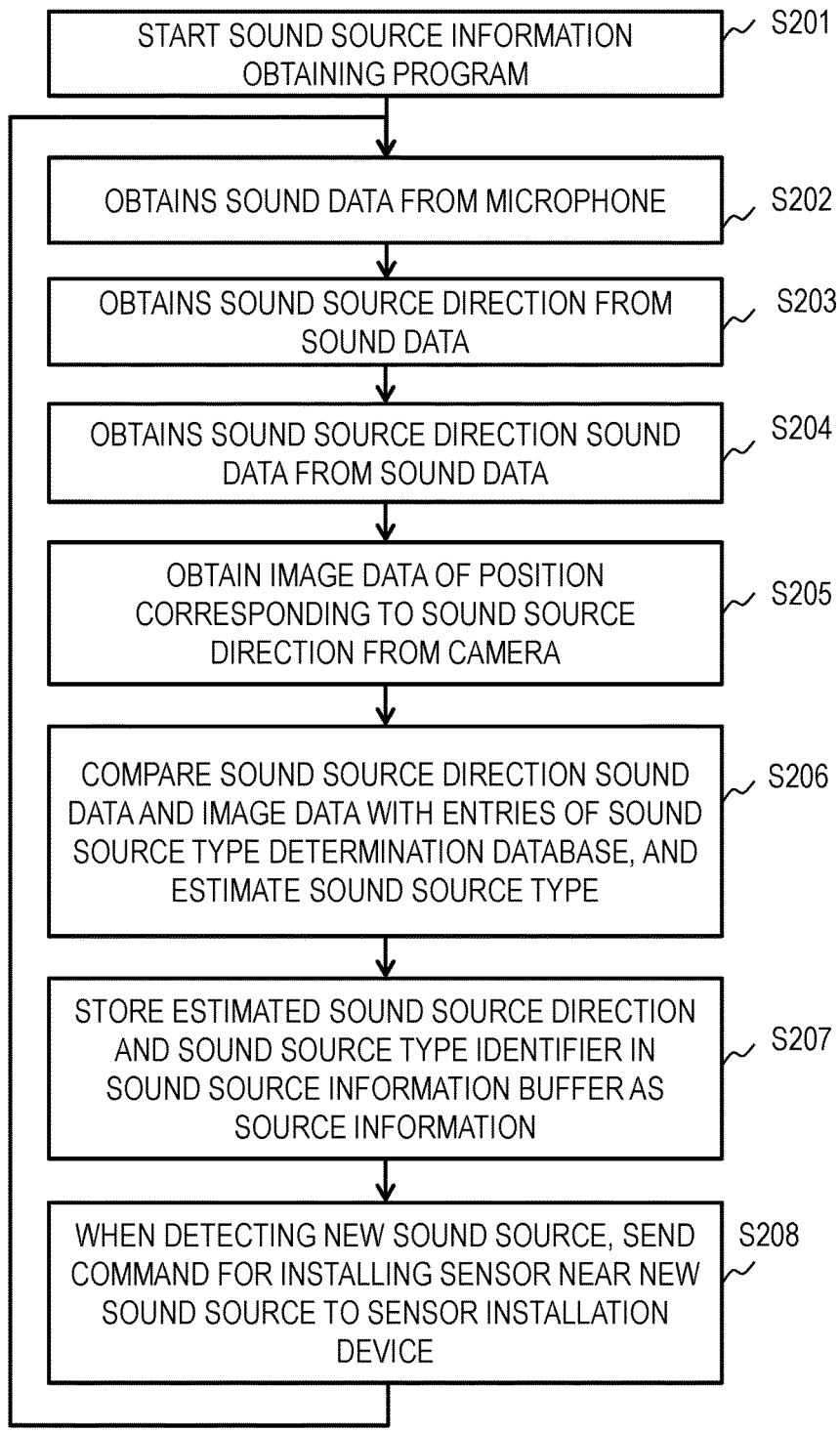
FIG. 7 is a flowchart showing an operation of the sound source information obtaining program 132 according to Embodiment 2.

FIG. 7 is a flowchart showing an operation of the sound source information obtaining program 132 stored in the storage device 130.

The sound source information obtaining program 132 is operational all the time while the present system is used (S201). First, the sound source information obtaining program 132 obtains sound data $w_t(c)$ from the microphone 121 (S202). Next, the sound source information obtaining program 132 analyzes the obtained sound data $w_t(c)$ and obtains the sound source direction $A_t$ (S203). The sound data $w_t(c)$ is a sample set of waveforms received from the microphone channel c at the time t. $A_t$ is a set of directions in which sound sources are expected to exist. For obtaining the set of directions in which sound sources are expected to exist $A_t$ from the sound data $w_t(c)$, a known method to estimate sound source directions using a microphone array may be used. For example, the sound source direction $A_t$ is calculated from the formula 4 using beamforming.

$$A_t = \{\theta | \Sigma |w_t(c) * a(\theta)|^2 > T\} \quad \text{[Formula 4]}$$

a(θ) is a vector representing a premeasured transfer function of sound from a direction θ, * is a sign of convolution, and T is a power threshold value for determining that a sound source exists.

Further, the sound source information obtaining program 132 obtains sound only from the sound source direction θ as the sound source direction sound data (S204). Thus, it is possible to use a known multichannel sound source separation method. Further, the sound source information obtaining program 132 sends a photographing command to the camera to obtain image data of the position corresponding to the sound source direction θ and receives the image data from the camera (S205). It is uncomplicated to calculate the data cut out area and do cropping from the angle of view of the camera. If the sound source direction θ is in a blind spot of the camera, the following process for the image data is skipped.

Next, the sound source information obtaining program 132 compares the obtained sound source direction sound data and the image data with entries of a sound source type determination database 146, and estimates the sound source type (S206). The sound source type determination contains a plurality of entries. Each entry presents a representative sound source and stores a sound source waveform model created by statistical modeling of sound data produce by the sound source, a sound source image template stored as the template of the appearance of the sound source, a sound source type identifier identifying the sound source type, and sound source movement information indicating whether the sound source is movable or immovable. The sound source information obtaining program 132 calculates the matching degrees between the sound source direction sound data and sound source waveform models, and the matching degrees between the image data and sound source image templates. The sound source information obtaining program 132 selects the sound source identifier and the sound source movement information of the entry of the maximum matching degree. For example, the matching degree between sound source direction sound data and a sound source waveform model may be calculated by a known sound matching method using HMM. For example, the matching degree between image data and a sound source image template may be calculated by a known sound matching method using image features.

The sound source information obtaining program 132 stores the estimated sound source direction $A_t$, the sound source type identifier and the sound source movement information in the sound source information buffer 142 (S207). Further, when the sound source information obtaining program 132 detects a new sound source, it sends a command for installing a sensor near the new sound source to the sensor installation device 126 (S208). The sound source information obtaining program 132 refers to the sound source position buffer, and when the estimated sound source position is not stored in the sound source position buffer, the sound source information obtaining program 132 determines that a new sound source is detected.

An operation of the sound source position estimation program 133 stored in the storage device 130 is described here.

The operation of the sound source position estimation program 133 is almost the same as Embodiment 1; however, the sound source position estimation program 133 according to Embodiment 2, at S304, performs the sound source position estimation only for sound sources whose sound source movement information indicates being immovable in the sound source information. It prevents false sound source position estimation caused by estimating the position of a sound source which has been estimated to be movable erroneously assuming it is immovable, and prevents inaccurate self-position estimation as a result.

Figure 8:
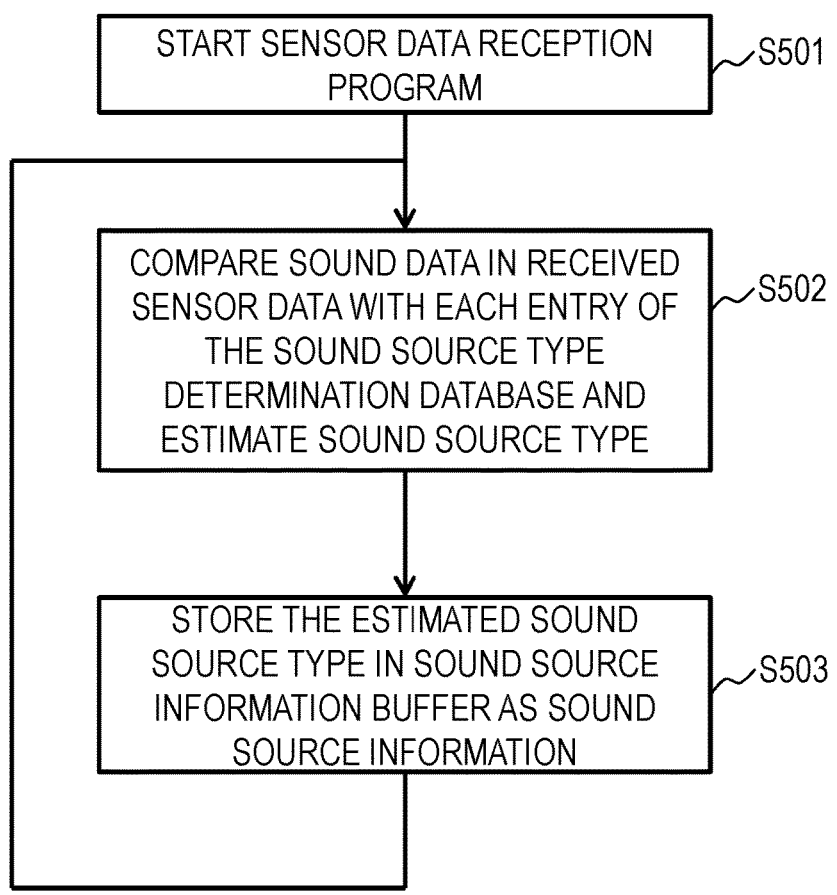
FIG. 8 is a flowchart showing an operation of a sensor data reception program 135 stored in the storage device 130 according to Embodiment 2.

FIG. 8 is a flowchart showing an operation of a sensor data reception program 135 stored in the storage device 130.

The sensor data reception program 135 is operational all the time while the present system is used (S501). First, the sensor data reception program 135 compares sound data in received sensor data with each entry of the sound source type determination database and estimates the sound source type identifier and the sound source movement information (S502). This method may be the same as the method by the sound source information obtaining program 132 described in S206. Next, the sensor data reception program 135 stores the estimated sound source type identifier and the sound source movement information in the sound source information buffer as the sound source information (S503).

It allows keeping updating the sound source type identifier and the sound source movement information in the sound source information buffer using the sound information from the sensor installed near the sound source even when the robot is away from the sound source.

An operation of a sound source information sending program 136 stored in the storage device 130 is described here. The sound source information sending program 136 sends the information regarding the sound source position estimated by the sound source position estimation program 133 to the tablet terminal 31 via the network. The sound source information sending program 136 may send the estimated sound source type identifier, the sound source movement information, the estimated position range determined from the distribution dispersion of the intersection point set, the sound source image data, the sound source observation time and the observed sound data as the sound source information together with the information regarding the sound source position. The sound source information sending program 136 may send the map data 143 and the route data 145 as the sound source information together with the information regarding the sound source position. Only the map data and route data of the estimated sound source and the vicinity may be sent.

Figure 9:
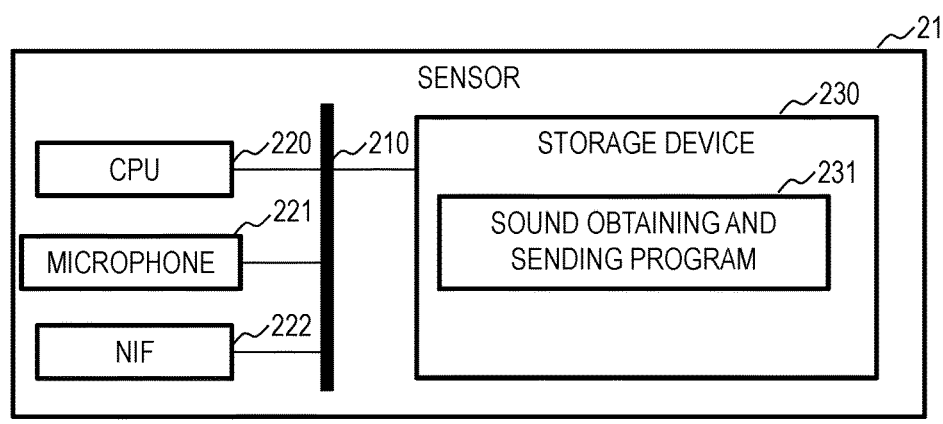
FIG. 9 is an example of a configuration diagram of a sensor 21 according to Embodiment 2.

FIG. 9 is an example of a configuration diagram of the sensor 21 according to the present embodiment. The configuration of the sensors 22 and 23 is the same as the sensor 21.

The sensor 21 is configured to include a bus 210, a CPU 220, a microphone 221, a NIF 222 and a storage device 230. The bus 210 interconnects the CPU 220, the microphone 221, the NIF 222 and the storage device 230 to relay data signals among them, and the standards (PCI, for example) used in general purpose computers may be used for bus 210. The CPU 220 operates in accordance with programs and sends control commands to the microphone 221, the NIF 222 and the storage device 230. A general purpose CPU (SH-4 processor, for example) or a general purpose chip controller may be used for the CPU 220. The microphone 221 collects sounds around the sensor. A commercial capacitor microphone and an A/D converter may be used for the microphone 221. The NIF 222 is connected wirelessly with the network 2 and handles communication with other devices on the network 2. The present invention is not restricted to the wireless connected defined here and the wired connection may be employed. The storage device 230 stores programs and data. For example, a commercial DRAM or HDD may be used for the storage device 230.

An operation of a sound obtaining and sending program 231 stored in the storage device 230 is described here.

The sound obtaining and sending program 231 is executed just after the sensor 21 is installed and sends the sound information observed by the microphone 221 to the robot 11 via the NIF 222.

Figure 10:
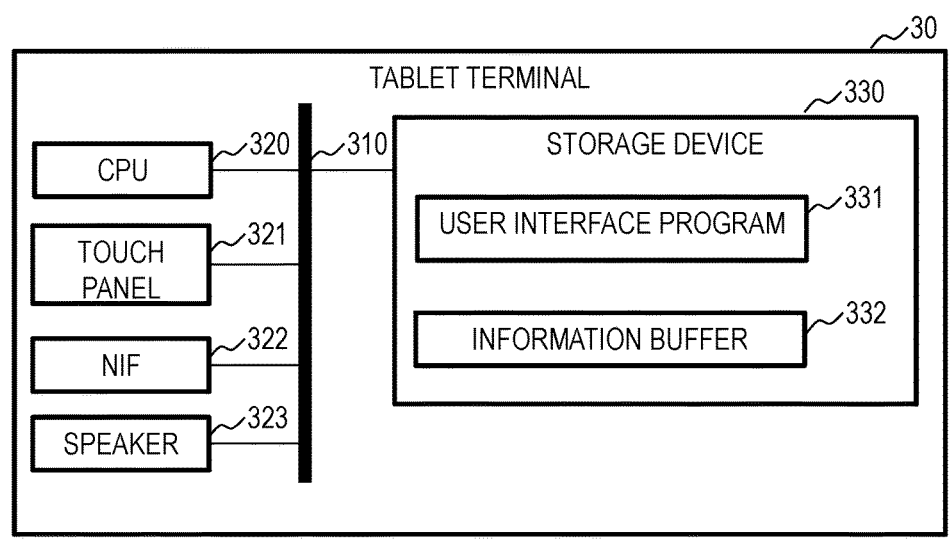
FIG. 10 is an example of configuration diagram of a tablet terminal 31 according to Embodiment 2.

FIG. 10 is an example of configuration diagram of the tablet terminal 31 according to the present embodiment.

The tablet terminal 31 is configured to include a bus 310, a CPU 320, a touch panel 321, a NIF 322 and a storage device 330. The bus 310 interconnects the CPU 320, the touch panel 321, the NIF 322 and the storage device 330 to relay data signals among them, and the standards (PCI, for example) used in general purpose computers may be used for bus 310. The CPU 320 operates in accordance with programs and sends control commands to the touch panel 321, the NIF 322 and the storage device 330. A general purpose CPU (SH-4 processor, for example) or a general purpose chip controller may be used for the CPU 320. The touch panel 321 is configured to display visual information to a user in accordance with display commands from the CPU 320, and detect a touch of the user and send the position to the CPU 320. The NIF 322 is connected directly with the network 2 and handles communication with other devices on the network 2. The storage device 330 stores programs and data. For example, a commercial DRAM or HDD may be used for the storage device 330.

An operation of a user interface program 331 stored in the storage device 330 is described here.

The user interface program 331 is operational all the time while the tablet terminal 31 is operating. Upon receiving the sound source information from the robot 11, the user interface program 331 displays it on the touch panel 321. When a touch by a user is detected and the user interface program 331 receives the touch information from the touch panel 321, the user interface program 331 obtains the sound associated with the symbol displayed on the position from the information buffer 332 and sends it to the speaker 323 to reproduce it.

Figure 11:
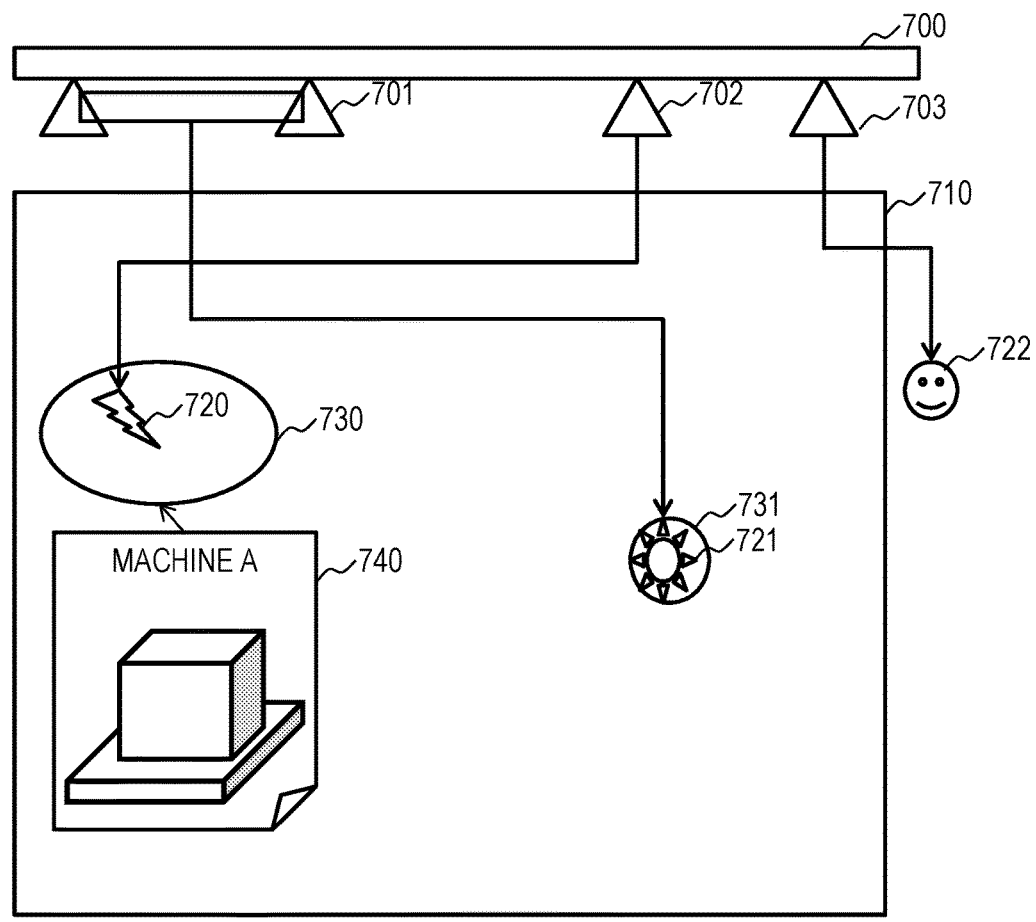
FIG. 11 is a display example on a touch panel 321 of the tablet terminal 31 according to Embodiment 2.

FIG. 11 is a display example on the touch panel 321 of the tablet terminal 31 according to the present embodiment.

The touch panel 321 displays an environmental map 710 and the sound source information for each sound source overlaid on the environmental map 710. The sound source information displays symbol images 720, 721 and 722 of the sound source type identifiers representing the sound sources on the sound source positions, and further displays estimated position ranges 730 and 731 determined from the distribution dispersions of intersection point sets, the sound source identifier and the sound source image data 740. The observation times of the sound sources 701, 702 and 703 are displayed on the time axis 700.

The sound source position estimation system 1 configured in accordance with the above described specifications allows a mobile robot to measure the position of a sound source accurately and improve the accuracy of self-position estimation. Further, it facilitates a user to access the information regarding the sound source obtained by the robot using a tablet terminal.

REFERENCE SINGS

11 Robot
21 Sensor
22 Sensor
23 Sensor
31 Tablet terminal
120 CPU
121 Microphone
122 LIDAR
123 Moving device
125 NIF
126 Sensor installation device
130 Storage device
220 CPU
221 Microphone
222 NIF
230 Storage device
320 CPU
321 Touch panel
322 NIF
323 Speaker
330 Storage device

What is claimed is:

1. A mobile robot comprising:
   a self-position estimation unit configured to estimate a self-position of the mobile robot;
   a sound source information obtaining unit configured to obtain direction information of an observed sound source; and
   a sound source position estimation unit configured to estimate a position of the sound source from the estimated self-position and the direction information of the sound source, wherein
   the sound source information obtaining unit estimates whether the sound source is movable or immovable based on a type of the sound source, and
   the sound source position estimation unit estimates the position of the sound source only for the sound source estimated to be immovable.

2. The mobile robot according to claim 1, wherein the self-position estimation unit corrects the self-position based on the estimated sound source position.

3. The mobile robot according to claim 2, wherein the sound source position estimation unit estimates the sound source position using the corrected self-position.

4. The mobile robot according to claim 1, wherein correction of the self-position corrects a difference between an observation time of observation data used in self-position estimation by the self-position estimation unit and an observation time of the observed sound source.

5. The mobile robot according to claim 4,
   wherein the sound source position estimation unit corrects a parameter of a predetermined moving model of the mobile robot based on the estimated self-position and the direction information of the sound source to estimate the position of the sound source, and
   wherein the self-position estimation unit corrects the self-position based on the estimated position of the sound source.

6. The mobile robot according to claim 1, further comprising:
   a sound source type determination database including a sound source waveform model for each sound source type,
   wherein the sound source information obtaining unit estimates the type of the observed sound source to be a type of a sound source a sound source waveform model of which maximizes a matching degree with a waveform of the observed sound source.

7. The mobile robot according to claim 6, further comprising:
   a camera,
   wherein the sound source type determination database includes a sound source image template for each sound source waveform model, and
   wherein the sound source information obtaining unit determines the type of the sound source based on matching degrees between an image taken by the camera and each sound source image template.

8. The mobile robot according to claim 1, further comprising:
   a sensor installation unit configured to install a sensor device in a space,
   wherein the sound source position estimation unit sends a command for installing the sensor device near a new sound source position to the sensor installation unit when the sound source position estimation unit detects the new sound source position.

9. A sound source position estimation system comprising:
a mobile robot; and
a program operating on a terminal,
wherein the mobile robot includes:
a self-position estimation unit configured to estimate a self-position of the mobile robot;
a sound source information obtaining unit configured to obtain direction information of an observed sound source;
a sound source position estimation unit configured to estimate a position of the sound source from the estimated self-position and the direction information of the sound source; and
a sound source information sending unit configured to send the estimated position of the sound source, and
wherein the sound source information obtaining unit estimates whether the sound source is movable or immovable based on a type of the sound source,
the sound source position estimation unit estimates the position of the sound source only for the sound source estimated to be immovable, and
the program operating on the terminal causes the terminal to display the position of the sound source with map data.

10. The sound source position estimation system according to claim 9,
wherein the sound source information sending unit sends a type of the sound source with the estimated position of the sound source, and
wherein the program causes the terminal to display the position of the sound source with the type of the sound source.

11. The sound source position estimation system according to claim 9,
wherein the sound source information sending unit sends an estimated position range indicating an area with high presence probability of the sound source, and
wherein the program causes the terminal to display the estimated position range.

12. The sound source position estimation system according to claim 11,
wherein the sound source information sending unit sends a sound source type identifier of the sound source, and
wherein the program causes the terminal to display a symbol image corresponding to the sound source type identifier at the position of the sound source.

13. The sound source position estimation system according to claim 9,
wherein the sound source information sending unit sends sound data of the observed sound source and data of a taken image, and
wherein the program causes the terminal to output the sound data of the sound source or to display the image.

14. The mobile robot according to claim 1,
wherein the sound source position estimation unit estimates a plurality of sound positions based on a plurality of pieces of sound source observation data and a plurality of self-position estimation results, and estimates the position of the sound source to be a position minimizing a dispersion of the estimated plurality of sound positions.

* * * * *